(12) United States Patent
Dusserre-Telmon et al.

(10) Patent No.: US 6,389,887 B1
(45) Date of Patent: May 21, 2002

(54) PROCESS FOR THE DETECTION OF DAMAGE TO COMPONENTS OF AN ENGINE

(75) Inventors: Guy Franck Paul Dusserre-Telmon, Sivry-Courtry; David Flores, Mennecy; Frédéric Prieux, Paris, all of (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 09/532,900

(22) Filed: Mar. 22, 2000

(30) Foreign Application Priority Data

Dec. 23, 1999 (FR) .......................................... 99 16323

(51) Int. Cl.[7] .......................................... G01M 15/00
(52) U.S. Cl. .......................................... 73/116
(58) Field of Search ................................ 73/116, 117.2, 73/117.3, 118.1

(56) References Cited

U.S. PATENT DOCUMENTS 5,182,512 A * 1/1993 Braun et al. ................. 73/116
5,387,253 A * 2/1995 Remboski, Jr. et al. .... 73/117.3
5,446,664 A * 8/1995 Vossen et al. .............. 73/117.3
6,128,959 A * 10/2000 McGovern et al. ........... 73/460

FOREIGN PATENT DOCUMENTS

| EP | 0 889 313 | 1/1999 |
| EP | 0 889 314 | 1/1999 |
| EP | 0 889 315 | 1/1999 |
| EP | 0 889 316 | 1/1999 |

* cited by examiner

Primary Examiner—Eric S. McCall
(74) Attorney, Agent, or Firm—Oblon, Spivak, McClelland, Maier & Neustadt, P.C.

(57) ABSTRACT

A process for the early detection of a possible fault in a rotary component of an engine wherein a signal representing an acceleration is stored in a sequential manner; the stored signal is transformed into a frequency signal a spectral coherence calculation is performed between said frequency signal and the same frequency signal shifted by frequency values predetermined as a function of the speed of the engine; the sequences are counted for which a correlation peak appears for one of the predetermined frequencies and a fault is deemed to be present if for a number P of consecutive sequences the number of sequences with a correlation peak is greater than a predetermined threshold.

10 Claims, 3 Drawing Sheets

PROCESS FOR THE DETECTION OF DAMAGE TO COMPONENTS OF AN ENGINE

BACKGROUND OF THE INVENTION

1. Field of the Invention

The invention relates to a process for the continuous monitoring of a mechanical component of an engine, in particular an important rotary component such as a rolling bearing or a gear of an aircraft engine, and involves monitoring in which the signal from one or more acceleration sensors is processed. The processing of the vibrational signal emanating from the sensor leads to the determination of one or more quantities resulting from or derived from the signal via the processing. These quantities are compared with thresholds so as to detect whether the monitored mechanical component has suffered damage.

2. Summary of the Prior Art

It is known to dispose acceleration sensors in places where these sensors can detect vibrations arising from the mechanical components to be monitored or from the machine in general, then to process the signals originating from the sensors so as to detect a significant abnormality of the signal transmitted by the sensor relative to the signal received in the absence of a fault.

Ideally, the detection of such abnormalities ought to allow a forecast of the remaining lifetime of the component being monitored before the damage becomes serious enough to lead to fracture or to a grave malfunction.

In practice, one generally does not have sufficient experience with regard to a large enough number of components to obtain statistically significant data for arriving at such a forecast.

In practice, the result of the processing is such that damage can be detected early enough so that at the time of detection, the member is still operating satisfactorily and one can be reasonably certain that it will continue to operate satisfactorily, preferably until a next periodic inspection of this member and at least until a next stopover when the member is mounted on a flying machine.

Patent applications EP 0889313 to 0889316 A2 filed on Jul. 3, 1998 disclose a good example of such methods.

In these applications, fifteen acceleration sensors and two azimuth sensors for sensing speeds of rotation are disposed at various sites close to members which together make up a block for transmitting motions to rotary members of a helicopter, in particular to the shaft of the main rotor and to the rear stabilising propeller.

All the signal processing methods described in these four applications comprise a step of acquiring the signal from an acceleration sensor, this involving a step of digitizing the signal from the sensor, carried out for example by means of a sample-and-hold circuit and an analog/digital converter.

The temporal signal thus sensed is transformed into a signal in the frequency domain, in each of the three application Ser. No. 08/89,313, '314 and '315. An initial sequence of values is thus obtained, each determining a vibration frequency and the amplitude associated with this frequency.

The processing described thereafter in application Ser. No. 08/89,313 provides for selecting and processing of the frequency samples so as to obtain a final sequence of samples. After returning to the time domain, an order moment of this temporal signal is calculated on the basis of the final sequence of samples and is compared with a predetermined threshold so as possibly to actuate an alarm. The method described in the '313 application is intended to detect the occurrence of an abnormality located at the level of an exterior shaft.

The processing described thereafter in the '314 application provides for the selecting of a determined frequency sample, the calculating of the amplitude of this sample and the comparison thereof with a reference value, the result being compared with a threshold.: This relatively crude method is intended to detect abnormalities which develop rapidly in flight.

The processing described thereafter in the '315 application provides for the selecting of two groups of frequency samples, the calculating of the energy associated with these two groups, a calculation of the deviation in energy between the two groups and the comparison of this deviation with a threshold. This method is intended to detect a fault on a shaft comprising two gears.

The processing described in the '316 application envisages, after the acquisition phase, a Hilbert transformation of the signal obtained, the defining of a complex number having the signal as its real part and the Hilbert transform as its imaginary part, the calculation of the phase of this complex number and of its derivative with respect to time, and lastly the comparison of this derivative with a threshold value.

In each of these four applications, ratios or variations are sought which impinge on what is called "an engagement frequency" or harmonics of this frequency. It is assumed that this involves the number of revolutions per second of the toothed wheel being monitored.

The reasons why, in these applications, certain quantities are tracked rather than others, are not explained, and therefore it is not known to what extent the teaching of these applications may be used in a different context from that described.

The teaching which may be gleaned from these examples is that the analysis of vibration signals from sensors placed close to rotating components may provide indications about the mechanical condition of these components. In particular, incipient cracking or a spreading crack can be pinpointed by virtue of such analysis. However, for each particular case, one needs to determine which frequencies are the ones which need to be analyzed and which out of all the processing possibilities are the most significant quantities to be monitored in order to obtain significant information about the mechanical components monitored.

SUMMARY OF THE INVENTION

The invention is intended to provide early detection of damage arising in particular in a revolving component of an engine for example a ball or roller bearing, or a gear. It is, however, possible to extend the field of the invention to a nonrevolving component, for example a fixed component such as a cowling, or to a component which is mobile in some other manner, for example a connecting-rod or a valve and its stem.

As in the prior art, the invention employs digital capture of the signal output by at least one acceleration sensor dedicated to the vibrational monitoring of the engine. This temporal signal is thereafter, as in the prior art, transformed into the frequency domain. It has been seen that in the prior art, a filtering is thereafter performed so as to select characteristic frequencies of the sought-after fault, and which in the aforementioned patent applications have been called "engagement frequencies". Processing operations are then performed on these characteristic frequencies so as to obtain quantities that can be compared with thresholds so as to draw conclusions therefrom relating to possible damage to the mechanical component tracked.

It has been found that the frequency signal obtained by transforming the temporal signal emanating from the sensor is very noisy. It has also been found that the signal corresponding to what has been called the engagement frequency reaches the sensor in a very weakened state, so that it is difficult to isolate any possible presence of this engagement frequency from the ambient noise necessarily present in an engine.

It has been further found that this "engagement frequency" can be present even in the absence of any fault, merely through the fact that the teeth intermesh. What needs to be detected therefore is a significant modification of the spectrum associated with this engagement frequency, for example a modification of the number of harmonic lines of this frequency and/or of the amplitude of vibration at this engagement frequency or at its harmonics.

A hypothesis has been put forward by the inventors that this engagement frequency could be present as a modification frequency of one or more fundamental frequencies of the engine. The expression fundamental frequencies of the engine refers to the frequency of rotation—number of revolutions per second—of the engine, or for engines having a low pressure compressor and a high pressure compressor, the frequencies of rotation of each of these bodies. In general, a fundamental frequency of an engine is a frequency of rotation of an important part, from the moment of inertia point of view, of the engine. A frequency resulting from damage will be a frequency at which this damage produces a shock. Ideally, the engagement frequency or rolling frequency would result from a succession of DIRAC pulses at this frequency.

In practice, these pulses have a less pure shape than a DIRAC pulse. The spectrum of the fault signal is therefore composed of lines at the frequency corresponding to the nature of the fault and at harmonic frequencies. The envelope of this line spectrum is determined by the shape of the pulses. It will be seen that in the case of searching for damage to a bearing race the damage frequency specific to the presence of the fault represents, per unit time, the number of occasions on which this fault is impacted by a ball or a roller of the bearing. In the case of a gear in which for example a tooth of a first wheel might be cracked or damaged, the frequency resulting from the damage would be the frequency with which this tooth comes into contact with the teeth of a second wheel meshing with the first. These examples show that, knowing the structure of the engine, its speed of rotation, and hence its instantaneous fundamental frequencies, it is possible to ascertain a damage-induced frequency emitted by the component being monitored.

The problem is therefore one of spotting the presence or the modification of characteristics of this frequency resulting from damage in a sufficiently stable and constant manner to isolate it from noise, and to conclude therefrom the presence of a fault in the monitored component, without generating false alarms. It is also important to spot this damage created frequency even though the fault at the origin of the appearance of this frequency is still at an early stage of its development. For example for a bearing, an early stage consists of the simple flaking of one of the bearing surfaces. However, at this early stage, the amplitude of the frequency or the modification of the characteristics of its associated spectrum resulting from the fault is small so that it is difficult to distinguish them from noise.

According to the invention, as in the prior art a sequence of the signals from at least one sensor of a vibratory acceleration signal will be sampled with a sampling frequency sufficient for Shannon's condition to be fulfilled for the largest of the frequencies to be recorded. According to a characteristic of the present invention, this is followed by checking that the engine speed has remained stable throughout the duration of the sequence, so as to reject those sequences for which the relative variation in the rotational speed is above a predetermined threshold. As in the prior art, the temporal signal obtained will then be converted into a frequency signal, for example by Fourier transformation, and the fundamental frequencies of the engine will be eliminated therefrom.

Thereafter, according to an important characteristic of the invention, a correlation will be performed between the frequency signal obtained and the same signal shifted by a frequency V.

The correlation of two functions is the measure of their mutual resemblance: it is essentially a comparison process.

Numerically, the signals are represented by strings of numbers which are successive samples of a continuous waveform.

The correlation function of f(k) and g(k), the two numerical strings obtained by sampling two continuous functions f(t) and g(t), is expressed mathematically by the relation:

$$S(k) = \int_{i=-\infty} f(i) \cdot g(i+k)$$

with I=sample index,
and k=shift index.

When f and g are different functions, we speak of cross-correlation.

When f and g are identical functions, we speak of auto-correlation.

In the case of a frequency signal expressed in the amplitude/frequency complex plane, we speak of spectrum and of spectral coherence.

Calculation of spectral coherence between the transform in the frequency domain of the vibrational signal picked up and this same transform shifted by a frequency V makes it possible to identify the resemblances between the two transforms. Under these conditions, the noise frequencies, unstable by nature, will be eliminated so as to leave only the stable frequencies, that is to say those which result from a stable origin.

These are the fundamental frequencies, their harmonics, the linear combinations of these frequencies and any stable modulating frequencies.

The stable modulating frequencies may comprise, even in the absence of a fault, the engagement frequency or in the case of a bearing, a rolling frequency resulting from the number of balls or rollers and from the frequency of rotation of the assembly formed by these balls or rollers.

If, for example, $F_{N1}$ and $F_{N2}$ are the frequencies of rotation of sizeable masses of the engine, for example the rotors of a low pressure body and of a high pressure body respectively, the signal output by the sensor will include the fundamental frequencies $F_{N1}$ and $F_{N2}$. It could also include the harmonics of these frequencies for example $2F_{N1}$, $3F_{N1}$, $2F_{N2}$, $3F_{N2}$. Moreover if the transmission chain is such that a signal which includes the frequency $F_{N1}$ passes through a vibrating member especially for example at the frequency $2F_{N2}$, one would have frequencies resulting from a modulation of one frequency by another, for example $2F_{N2}+F_{N1}$, $2F_{N2}-F_{N1}$. For these reasons, the spectrum of an engine will exhibit, for each particular case, that is to say for each type of engine and each sensor location, and also for ranges of engine speed, a characteristic line spectrum.

For one type of engine, a sliding coherence calculation, that is to say one in which the shift. V is varied step by step from frequency values resulting from combinations of fundamental values obtained over small multiples of the fundamental frequencies for example the multiples lying, limits included, between 0 and 4 and around these combinations, will make it possible to spot in respect of the engine speed investigated, for example in respect of those speeds which are used the longest during each flight, the lines normally present, that is to say in the absence of faults. The same search for lines will then need to be performed with an engine equipped with a component exhibiting at an early stage the fault which one will then seek to detect.

For this search, the shift V will be fixed at frequency values resulting from the modulation of the frequencies present during normal operation by the frequency resulting from damage or by harmonics of this frequency.

In order for the method of the invention to be of interest, the spectrum resulting from the fault must be different from the spectrum during normal operation, through the presence of a frequency which is not present with an amplitude sufficient to be detected even by means of the spectral coherence calculation. Indeed, any modification to the amplitude of this frequency by reason of the presence of the fault does not necessarily cause a significant variation in the value of the coherence peak.

On the other hand, such an amplitude modification for a frequency by reason of the fault may be detected by known methods comprising a bandpass filtering centered on the sought-after frequency and a calculation of the energy or of the amplitude of the spectrum resulting from the filtering.

To summarize, according to the invention there is provided a process for the early detection of the appearance of a fault in a component of an engine, said process comprising:
- a preliminary phase of investigation using an engine of the same design to identify, for at least one operating speed of the engine, frequency spectral lines present during operation of the engine in the absence of a fault and then in the presence of a fault so as to identify specific spectral lines for the fault; and
- a detection phase during which the following steps are carried out in an iterative manner in the course of operation of said engine:
  - acquiring a string of digital samples representative of a vibratory acceleration signal in the course of an acquisition sequence;
  - checking that the speed of said engine has remained stable during said acquisition sequence;
  - and applying to the stable sequences acquired the following processing operations in real time during operation of said engine or in delayed time:
  - transforming the signal acquired by temporal sampling into a frequency signal, while eliminating the fundamental frequencies of said engine and their harmonics,
  - performing at least one normed coherence calculation between said frequency signal and the same frequency signal shifted by a frequency value corresponding to the value of one of the specific frequencies of the fault detected during said preliminary phase,
  - comparing the value of a coherence peak obtained by the coherence calculation with a first threshold and storing a 1 detection value if this peak is greater than said first threshold and a 0 value if said peak is not greater than said first threshold,
  - summing P stored detection values and dividing the sum obtained by P to provide a detection ratio, and deeming a fault to be present if said detection ratio is greater than or equal to a second predetermined threshold.

Preferably, the P detection values which are used to establish the detection ratio are values corresponding to P sequences chosen from among the most recent ones recorded in engine speed ranges considered to be of interest. These will not necessarily be ones which are most recent in time in an absolute manner, but ones which are most recent within the engine speed ranges judged to be of particular interest.

The number P is an integral number greater than or equal to 1.

BRIEF DESCRIPTION OF THE DRAWINGS

Other characteristics of the process according to the invention and variants thereof will be clarified in the following description of preferred embodiments with reference to the appended drawings wherein.

DESCRIPTION OF THE PREFERRED EMBODIMENTS

Figure 1:
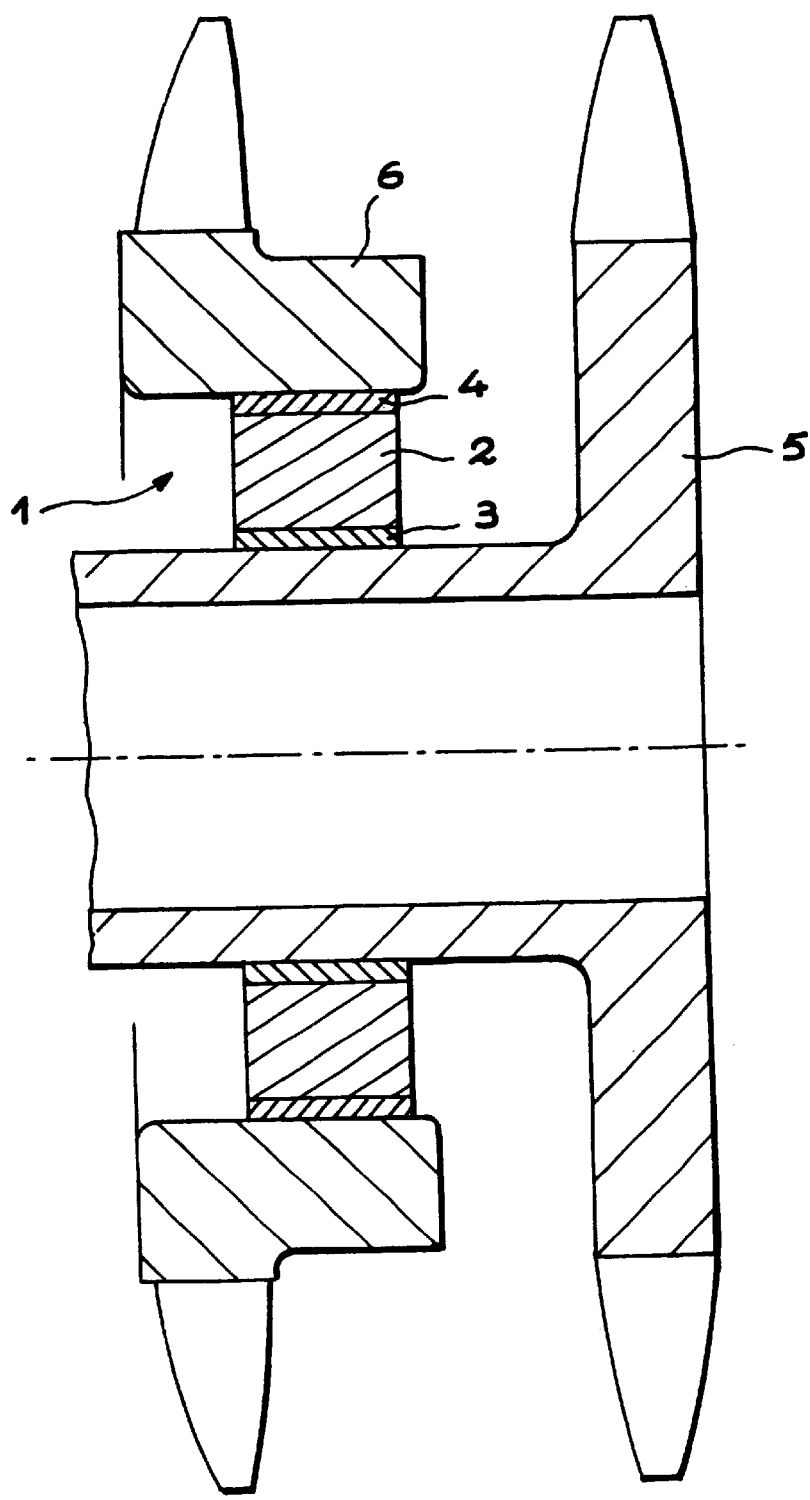
FIG. 1 shows diagrammatically a longitudinal section of a bearing race.

The process according to the invention has been used to monitor the condition of a rotor bearing of an engine. This bearing is represented very diagrammatically in axial section in FIG. 1.

The bearing comprises a roller bearing 1 having rollers 2 which roll between two races, an inner race 3 and an outer race 4.

The inner race 3 centers a shaft 5 of a rotor of a low pressure body of the engine. This body is not otherwise shown since it is not required for an understanding of the invention. The outer race 4 centers a shaft 6 of a high pressure body of the same engine.

Figure 2A:
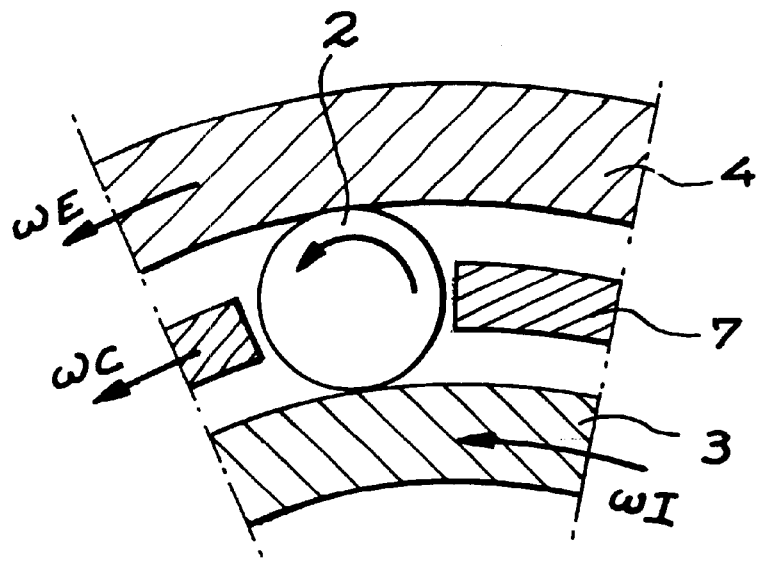
FIG. 2a shows a partial diagrammatic section through a bearing in a plane perpendicular to the axis of the bearing.
Figure 2B:
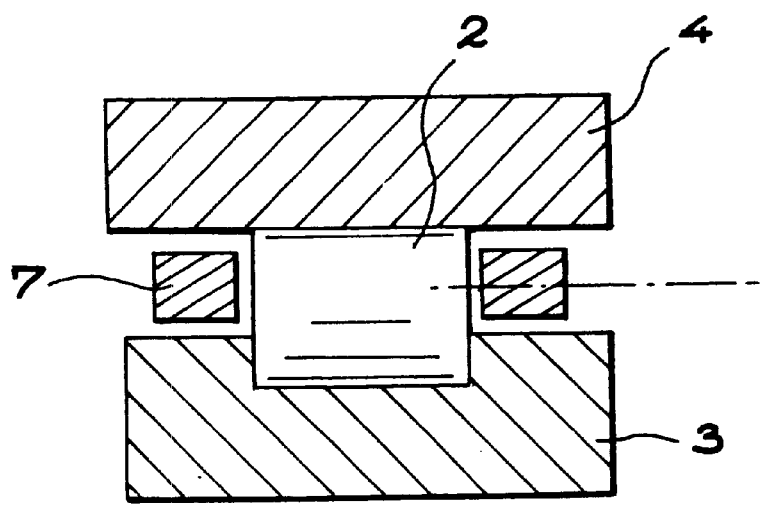
FIG. 2b shows a partial diagrammatic section through the bearing in an axial plane of the bearing.

Partial transverse and axial sections of this bearing are shown in FIGS. 2a and 2b respectively. The shafts 5 and 6 (FIG. 1) rotate at different speeds, $W_e$ for the shaft 6 centered by outer race 4 and $W_i$ for the shaft 5 centered by the inner race 3. The speeds of rotation $W_e$ and $W_i$ may be regarded as independent of one another. They are however known at any moment. The outer race linked with the rotor of the high pressure body revolves more quickly than the inner race and the two races revolve in the same direction.

Between the two races are Z rolling bodies 2, for example rollers, held by a cage 7. Except when slipping, which is low at stable speeds, the cage 7 revolves at a rate $W_c$. A bearing factor γ is defined as the ratio of the diameter d of a roller to the diameter dm of the median cylinder of the two races 3 and 4.

The fault which one seeks to detect is a fault in the outer race 4 of the bearing, for example flaking. This fault is represented by a star in FIG. 2a.

The speed $W_c$ of rotation of the cage is given by the formula:

$$W_c \frac{1-\gamma}{2} W_i + \frac{1+\gamma}{2} W_e$$

The frequency $f_D$ resulting from damage will be equal to the number of times that a roller impacts the fault.

Neglecting a slippage factor of the rolling bodies, this frequency $f_D$ is proportional to the difference $N_2-N_1$ between the number of revolutions per second of the outer race and the number of revolutions per second of the inner race.

The hypothesis put forward by us is that this frequency $f_D$ will be transmitted to the sensor of a vibrations acceleration signal through members which are themselves vibrating, in particular at the fundamental frequencies.

A coherency calculation is performed between the Fourier transform of the vibrational signal picked up and the Fourier transform of the same signal shifted by a cyclic frequency V.

The asymmetric spectral coherence of a signal x(t) for the cyclic frequency V is given by the formula:

$$C_x^v(f) = \frac{E[x(f) \cdot x*(f-V)]}{(E[|x(f)|^2 \cdot E[|x(f-V)|^2)^{1/2}}$$

In this formula $C_x^v$ (f) is the value of spectral coherence between the vibrational signal picked up by the sensor and the same signal shifted by the cyclic frequency V, X(f) represents the Fourier transform of the vibrational signal X*(f-v), X*(f-v) represents the conjugate of the transform of the vibrational signal x(t), shifted by the cyclic frequency V, E[. . . ] denotes the mathematical expectation, $E[|X(f)|^2]$ and $E[|X(f-v)|^2]$ respectively representing the spectral power densities of the signals X(t) and of the inverse Fourier transform of X(f-v), E[X(f).X * (f-v)] represents the spectral density of interaction of the signals x(t) and of the inverse Fourier transform of X(f-v).

Additional information may be found in HURD "An investigation of Periodically correlated processes" Ph. D dissertation in engineering. DUKE UNIVERSITY 1970 and in GARDNER "Statistical Spectral analysis. A non probabilistic Theory" Prentice Hall 1988.

The method of estimation used is that of the averaged periodogram which uses the fast Fourier transform. Max and LACOUME "Méthodes et techniques de traitment de signal et application aux mesures physiques, Tome 1: principes généraux et méthodes classiques" 5th edition, MASSON 1996.

The spectral coherence is normed and therefore lies between 0 and 1. In view of the fact that one is working on a finite duration signal which is also noisy, it is not possible to have values equal to 0 or 1. High spectral coherence, for example greater than 0.8 for the frequencies f and (f-v) indicates that these frequencies emanate from the same physical phenomenon, for example through modulation of a source signal, for example at the frequency $F_{N1}$ or $F_{N2}$ by a periodic signal at the fault frequency $F_D=(F_{N2}-F_{N1})$.

Depending on the position of the sensor relative to the fault, it will be possible to have modulations due to an imbalance of the shafts 6 or 5 causing a modulation by a frequency $F_{N2}$ and/or $F_{N1}$ respectively. In the particular case investigated, it has been noted that the frequencies of modulation of the fault frequency were functions of the difference $(F_{N2}-F_{N1})$ in frequency of rotation of the two shafts.

Under these conditions, the continuous search for the appearance of the fault, based on the search for the fault frequency, includes the following iterative steps as explained above:

a sequence of capturing samples, which sequence may have a duration of for example between 30 seconds and one minute;

the checking that for the duration of the sequence the speed has remained stable, and the rejecting of the sequences which do not comply with this condition.

It should be noted that according to a variant, the sample capture sequence can be initiated only if the engine is rotating at a speed which lies in a range which was established in the course of the preliminary phase to be of particular interest.

If the sequence meets the required stability conditions, the processing in accordance with the invention is begun.

In the embodiment which is being described, the sequence is divided into n parts, so as to obtain sub-sequences for example of from one second to a few seconds each. In the preferred embodiment, the sub-sequences partially overlap one another, for example by 50%.

A discrete Fourier transform of each sub-sequence is then performed.

The coherence calculation is performed on each of the sub-sequences, taking as shift value V, the various modulating frequencies resulting from the transmission model described above.

Each coherence calculation makes it possible to obtain n coherence samples. The average coherence is equal to the average of the coherence samples.

If for at least one of the shifts, the normed average coherence is greater than a threshold of 0.8, there is coherence and it is stored in a memory. The processing is then continued as described above.

When for the p preferably last consecutive sequences and for one and the same shift, the number of sequences with positive coherence is greater than a predetermined threshold, or what amounts to the same if the ratio of the number of positive coherences relative to the number p of sequences is greater than a threshold, there is deemed to be a fault.

Alternatively or additionally, one can, for each sequence within a string of sequences, perform a sliding coherence calculation, and store the frequency values V for which a coherence peak greater than the predetermined threshold, for example 0.8, is obtained. One thus builds a signature of the speed at which the sequence was performed. This signature is compared with an earlier stored signature.

The sequences for which there is a significant deviation between the current signature and the stored signature are counted. There is deemed to be an abnormality if for a number Q of consecutive sequences, the number r of sequences which deviate from the stored signature is greater than a predetermined threshold ($r \leq Q$).

Experiments conducted on various engines of the same type have led to the finding that in certain cases the coherence calculation would not always lead to detection of the fault although it is detectable by other methods. On other occasions the fault is detected by the coherence method although not by other methods. This is why, according to a preferred method of fault detection also allowing issue and differentiation of alert levels, additional processing operations are carried out. Some of these processing operations may be performed in parallel with the processing described above.

For these processing operations, after transformation of the temporal digital signal into a frequency signal for example by fast Fourier transform and filtering of the fundamental frequencies of the engine and of their harmonics, one examines whether the largest amplitudes of the frequency signal are greater than a first low threshold of amplitude and if so, whether they are also greater than a second high threshold of amplitude. If the largest amplitudes are greater than the low threshold, one examines whether over several data sequences, for example "a" data sequences, the differential harmonic degree is the same for at least b sequences, a and b are integers greater than or equal to 1, $b \leq a$. The differential harmonic degree or ratio is the value of the ratio of a frequency value of amplitude greater than one of the thresholds to the value of the fault frequency. In the case of the bearing, this frequency is $(F_{N2}-F_{N1})$ as explained above.

If the values of these ratios remain constant to within a predetermined percentage error, one will conclude that the fault is present.

A message of level 1 will be issued if the harmonic ratio remains constant for at least b sequences out of a sequences and if the amplitude threshold is greater than the second high threshold of amplitude. This will in fact signify that the fault is present and sufficiently well marked to cause this high amplitude level.

A message of level 2 will be issued if the harmonic ratio remains constant for at least b sequences out of a sequences and if the amplitude level is greater than the second low threshold while being less than the second high threshold of amplitude.

A message of level 3 will be issued if the amplitude level remains less than the first threshold of low level and if the spectral coherence tests give one of the following results:

1) if as indicated above the spectral coherence test performed with $V=F_{N2}-F_{N1}$ leads to a detection ratio of greater than or equal to the second predetermined detection ratio threshold,
2) if as indicated above, the spectral coherence test performed with $V=N_1$ or $N_2$ leads to a detection ratio greater than or equal to the second predetermined ratio threshold and if, moreover, the coherence peaks are spaced apart by a value $(F_{N2}-F_{N1})$ for at least b sequences out of a,
3) if as indicated in 2) above, the spectral coherence test performed with $V=N_1$ or $N_2$ leads to a detection ratio greater than or equal to the second predetermined ratio threshold and if moreover the differential harmonic ratio between one of the frequencies for which a coherence peak has been detected and the fault frequency is stable for several processed sequences, that is to say remains constant for b sequences out of a sequences.

The processing and alert issuing mode described hereinabove is summarized in FIG. 3.

In a step 10, one carries out the acquisition and saving, for example by storing in a memory, of the data originating from a sensor of a vibratory acceleration signal. As already explained above, those sequences for which the engine speed regime is unstable during the recording of the frequency are not kept saved.

In step 11, one performs the fast Fourier transformation (FFT) and filtering so as to eliminate the frequencies resulting from the rotating of rotor assemblies with a high angular momentum such as the high and low pressure bodies.

In step 12, spectral coherence calculations are performed with shifts V corresponding to the fault frequency, or to each of the frequencies resulting from the rotation of the high and low pressure bodies. At step 13, a message of level 3 is possibly issued if one of the results 1, 2 or 3 described above is obtained.

In parallel with step 12, the amplitude level of the frequencies of greatest amplitudes of the frequency signal obtained from step 11 is compared with a first low threshold in step 14.

If considered stable, because frequency amplitudes appearing over a number of recorded sequences equal to 3 (b=a=3) are greater than the first low threshold, these amplitudes are compared with a second high threshold in step 15.

If in step 14 one finds that the biggest amplitudes of the frequency signal are less than the first low threshold, the parallel processing is halted.

In such a case, the processing includes only steps 10, 11, 12 and possibly 13.

If on the other hand it is found that the biggest amplitudes of the frequency signal are greater in a stable manner than the first low threshold, one will look to see, in step 17, whether the differential harmonic degree of at least one of the frequencies greater than the low threshold is stable. If so, a message of level 2 will be issued in step 18. Moreover if the biggest amplitudes of the signal are greater than the second high threshold and it is found in step 17 that the differential harmonic degree is stable, then a message of level 1 will be issued in step 19.

A differential harmonic degree or ratio is obtained by dividing the frequency of the spectrum exhibiting a large amplitude by the fault frequency $(F_{N2}-F_{N1})$.

The threshold value of the coherence peak, above which there is reckoned to be coherence, is fixed at 0.8.

Figure 3:
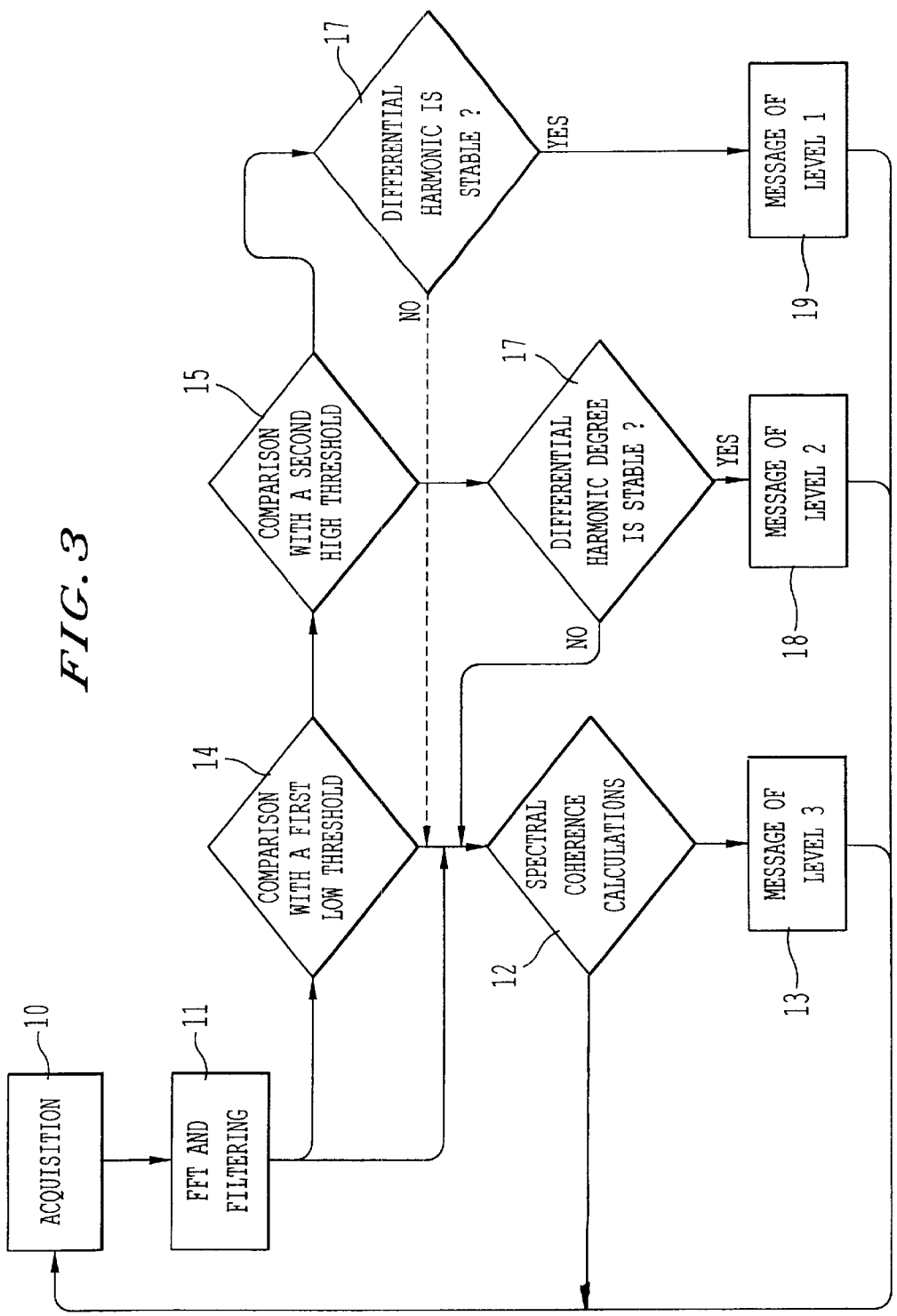
FIG. 3 is a flow chart showing diagrammatically a preferred mode of carrying out the invention.

In the particular example represented in FIG. 3, we have taken a=b=3. To summarize, according to the preferred embodiment of the invention, a message of level 3 is issued solely when the detection of the fault results only from the coherence calculation.

This message is issued if with $V=(F_{N2}-F_{N1})$ the ratio between the number of times for which there is a coherence peak greater than the first threshold, for example 0.8, and the number p of sequences examined is greater than the second predetermined threshold.

If the detection is obtained by doing the coherence calculation with $F_{N1}$ or $F_{N2}$, one also looks to see if among the sequences examined in the course of this calculation there are at least b out of a for which the differential harmonic ratio is constant.

The numbers p, a and b and the second predetermined threshold are independent of one another. However, by construction, the second predetermined threshold is less than 1, and $b \leq a$.

The messages of level 2 and 3 are issued if in a stable manner, that is to say for at least b sequences taken out of a, the amplitudes are greater than the first low threshold or than the first high threshold. Obviously, if an amplitude is greater than the high threshold it is necessarily greater than the low threshold. It may therefore happen that a message of level 2 and a message of level 1 must be issued simultaneously. In this case, only the message of level 1 will be issued.

In step 17, the frequencies to be taken into account in performing the calculation of the differential harmonic ratio may be determined through a spectral coherence calculation with $V=(F_{N2}-F_{N1})$. The difference with step 12 case 1 or 2 is that in step 17 one looks at the constancy of the differential harmonic ratio.

What is claimed is:

1. A process for early detection of an appearance of a fault in a component of a first engine, said process comprising:
   a preliminary phase of investigation using a second engine with a same design as said first to identify, for at least one operating speed of the engine, frequency spectral lines present during operation of the second engine without a fault and then with the fault so as to identify specific spectral lines for the fault and
   a detection phase during which t he following steps are carried out in an iterative manner in the course of operation of the second engine:
      acquiring a string of digital samples representative of a vibratory acceleration signal in the course of an acquisition sequence;
      checking that the speed of the second engine has remained stable during said acquisition sequence;
      and applying to stable sequences acquired the following processing operations in real time during operation of the second engine or in delayed time:
         transforming the signal acquired by temporal sampling into a frequency signal, while eliminating fundamental frequencies of the second engine and harmonic characteristics thereof,
         performing at least one normed coherence calculation between said frequency signal and the same frequency signal shifted by a frequency value corresponding to a value of one of the frequency spectral lines of the fault detected during said preliminary phase,
         comparing a value of a coherence peak obtained by the coherence calculation with a first threshold and storing a 1 detection value if said peak is greater than said first threshold and a 0 value if said peak is not greater than said first threshold, summing P stored detection values a and dividing the sum obtained by P to provide a detection ratio, and
         deeming a fault to be present if said detection ratio is greater than or equal to a second predetermined threshold.

2. The process as claimed in claim 1, which comprises defining ranges of interest and said detection phase includes checking that the speed of said engine is in one of said ranges of interest prior to the execution of a samples acquisition sequence.

3. The process as claimed in claim 1, wherein the P detection values used to establish the value of said detection ratio result from the processing of acquired sequences which are the most recent in each of the engine speed ranges in the course of which these sequences were acquired.

4. The process as claimed in claim 1, which comprises, in addition to the detection of a fault, issuing a detection message having a level which is variable as a function of detection-related conditions.

5. The process as claimed in claim 4, which comprises issuing a message of level 3 if the coherence peak is obtained for a frequency shift V corresponding to an unmodulated frequency ($F_{N2}-F_{N1}$) specific to the frequency of the fault.

6. The process as claimed in claim 4, which comprises issuing a message of level 3 if spectral coherence peaks are obtained by a frequency shift V corresponding to one of a plurality of fundamental frequencies of the engine and, moreover, coherent peaks of level greater than threshold coherence peaks are spaced apart by a frequency value corresponding to an unmodulated frequency ($F_{N2}-F_{N1}$) specific to the fault frequency.

7. The process as claimed in claim 4, which comprises issuing a message of level 3 if one or more coherence peaks are obtained with a frequency shift V corresponding to one of a plurality of fundamental frequencies of the engine and, moreover, the ratio between the frequency for which at least one of the coherence peaks is greater than a second coherence threshold and one of the frequencies corresponding to an unmodulated frequency ($F_{N2}-F_{N1}$) specific to the presence of the fault remains the same for a minimum number b of sequences out of a predetermined number a of sequences.

8. The process as claimed in claim 4, which comprises comparing, in parallel with coherence processing, amplitudes of frequencies making up the frequency signal obtained after transforming a temporal vibratory acceleration signal into a frequency signal with a first low threshold, and issuing a message of level 2 if, for one of the frequencies whose amplitude is greater than said first low threshold, the ratio between said one frequency whose amplitude is greater than said first low threshold and one of the frequencies corresponding to an unmodulated frequency ($F_{N2}-F_{N1}$) specific to the presence of the fault remains the same for a predetermined number of sequences.

9. The process as claimed in claim 4, which comprises comparing, in parallel with coherence processing, amplitudes of frequencies making up the frequency signal obtained after transforming a temporal vibratory acceleration signal into a frequency signal with a second high threshold, and wherein a message of level 1 is issued if, for one of the frequencies whose amplitude is greater than said second high threshold, the ratio between said one frequency whose amplitude is greater than said second high threshold and one of the frequencies corresponding to an unmodulated frequency ($F_{N2}-F_{N1}$) specific to the presence of the fault remains the same for a predetermined number of sequences.

10. A process for early detection of an appearance of a fault in a rotary component of an engine, said process comprising:
   a preliminary phase of identifying frequency spectral lines present during operation of said engine without a fault in order to form an engine signature, for at least one operating speed of the engine; and
   a detection phase during which, in the course of operation of the engine, the following steps are carried out in an iterative manner for the same engine speeds as those for which an engine signature has been established and stored:
      acquiring a digital string of samples representative of a vibratory acceleration signal in the course of an acquisition sequence,
      verifying that during said acquisition sequence, engine speed has remained stable, and
      applying the following processing steps to stable acquisition sequences:
         transforming the signal acquired by temporal sampling into a frequency signal, performing a sliding normed coherence calculation between said frequency signal and the same frequency signal shifted step by step by a sliding frequency value, storing the frequency values V for which a coherence peak greater than a predetermined threshold is obtained, thus constituting a signature of the speed at which a sequence was carried out, comparing said signature with a prior signature stored for the same engine speed, counting the sequences for which there is a significant deviation between the current signature and a stored signature, and deeming there to be an abnormality if for a number Q of consecutive sequences, the number p of sequences deviating from the stored signature is greater than a predetermined threshold.

* * * * *